US012647510B2

(12) United States Patent
Nie

(10) Patent No.: US 12,647,510 B2
(45) Date of Patent: Jun. 2, 2026

(54) NOTIFICATION METHOD, RELATED APPARATUS, AND SYSTEM

(71) Applicant: Honor Device Co., Ltd., Shenzhen (CN)

(72) Inventor: Yuxin Nie, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 311 days.

(21) Appl. No.: 18/288,877

(22) PCT Filed: Apr. 1, 2022

(86) PCT No.: PCT/CN2022/084914
§ 371 (c)(1),
(2) Date: Oct. 30, 2023

(87) PCT Pub. No.: WO2022/247464
PCT Pub. Date: Dec. 1, 2022

(65) Prior Publication Data
US 2024/0214489 A1      Jun. 27, 2024

(30) Foreign Application Priority Data

May 25, 2021    (CN) .......................... 202110570127.7

(51) Int. Cl.
H04M 1/72484      (2021.01)
H04L 51/224      (2022.01)
H04M 1/72412      (2021.01)
(52) U.S. Cl.
CPC ...... H04M 1/72484 (2021.01); H04L 51/224 (2022.05); H04M 1/72412 (2021.01)

(58) Field of Classification Search
None
See application file for complete search history.

(56) References Cited

U.S. PATENT DOCUMENTS

| | | | | |
|---|---|---|---|---|
| 11,385,857 | B2 * | 7/2022 | Fan | ....................... G06F 3/0488 |
| 2016/0012465 | A1 * | 1/2016 | Sharp | ................... G06Q 20/321 |
| | | | | 705/14.17 |
| 2022/0050656 | A1 * | 2/2022 | Fan | .......................... G06F 9/452 |

FOREIGN PATENT DOCUMENTS

| | | |
|---|---|---|
| CN | 105515951 A | 4/2016 |
| CN | 106657329 A | 5/2017 |

(Continued)

*Primary Examiner* — Parul H Gupta
(74) *Attorney, Agent, or Firm* — Leydig, Voit & Mayer, Ltd.

(57)      ABSTRACT

This application relates to the terminal field, and discloses a notification method, a related apparatus, and a system. When sending notification information to a second electronic device, a first electronic device sends information about one or more controls (for example, an identifier corresponding to each of the one or more controls) related to the notification information. When the second electronic device receives an input operation for a first control of the one or more controls, the second electronic device may send an identifier corresponding to the first control to the first electronic device. After receiving the identifier corresponding to the first control, the first electronic device may determine, based on the identifier, an operation corresponding to the first control, and perform the operation. Therefore, a user may further process the notification information based on the second electronic device. This simplifies a user operation.

17 Claims, 9 Drawing Sheets

(56)                    References Cited

FOREIGN PATENT DOCUMENTS

| CN | 108600552 A | 9/2018 |
| CN | 109491625 A | 3/2019 |
| CN | 111666119 A | 9/2020 |
| EP | 3907597 A1 | 11/2021 |
| JP | 201260494 A | 3/2012 |
| WO | 2013045983 A1 | 4/2013 |

* cited by examiner

Communication system 10

Wireless communication

Electronic device 100

Electronic device 200

Electronic device 100

Electronic device 200

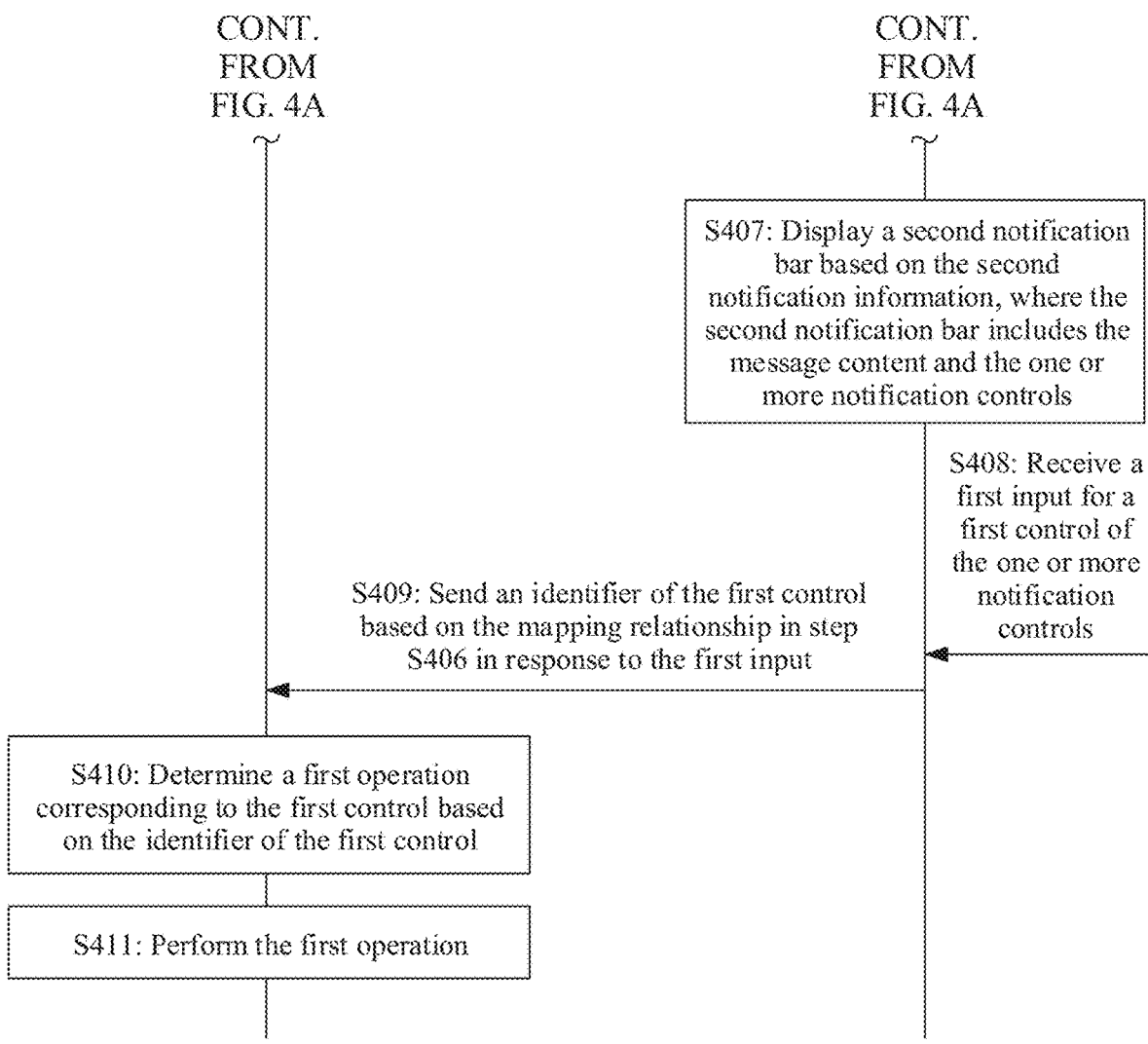

CONT.
FROM
FIG. 4A

CONT.
FROM
FIG. 4A

S407: Display a second notification
bar based on the second
notification information, where the
second notification bar includes the
message content and the one or
more notification controls S408: Receive a
first input for a
first control of
the one or more
notification
controls S409: Send an identifier of the first control
based on the mapping relationship in step
S406 in response to the first input S410: Determine a first operation
corresponding to the first control based
on the identifier of the first control S411: Perform the first operation

FIG. 4B

NOTIFICATION METHOD, RELATED APPARATUS, AND SYSTEM

CROSS-REFERENCE TO RELATED APPLICATIONS

This application is a national stage of International Application No. PCT/CN2022/084914, filed on Apr. 1, 2022, which claims priority to Chinese Patent Application No. 202110570127.7, filed on May 25, 2021. The disclosures of both of the aforementioned applications are hereby incorporated by reference in their entireties.

TECHNICAL FIELD

This application relates to the terminal field, and in particular to a notification method, a related apparatus, and a system.

BACKGROUND

With the rapid development of terminal technologies, various types of electronic devices, such as mobile phones, smart watches, wearable devices, and tablet computers, have become an indispensable part of people's life. A user often uses different types of electronic devices simultaneously, to enable a communication connection (for example, a wired communication connection and/or a wireless communication connection) to be established between the electronic devices. Based on the communication connection, when an electronic device receives and displays various types of notification information (such as text information, an email, and an application notification), another device that establishes a communication connection to the electronic device may synchronously receive and display the same notification information displayed by the electronic device. For example, when a mobile phone receives and displays notification information of a specific application, correspondingly, a smart watch that establishes a wireless communication connection to the mobile phone may synchronously receive and display the notification information of the specific application.

However, at present, another device that establishes a communication connection to an electronic device may only display notification information, and there is no way for a user to further process the notification information on the another device, but the user may only perform interaction for the notification information on the electric device. This leads to frequent and complicated user operations.

SUMMARY

This application provides a notification method, a related apparatus, and a system. Based on this, when a first electronic device displays notification information and a notification control, a second electronic device may also display the notification information and some or all of the notification control displayed on the first electronic device. A user may further process the displayed notification information based on the second electronic device. This simplifies a user operation.

According to a first aspect, this application provides a notification method. The method includes: A first electronic device establishes a communication connection to a second electronic device. The first electronic device obtains first notification information of a first application. The first notification information includes first message content, control information corresponding to the first message content, and first extension information. The control information includes data information of a first control and data information of a second control. The first extension information includes a first identifier of the first control. The first electronic device displays a first notification bar based on the first notification information. The first notification bar includes the first message content, the first control, and the second control. The first electronic device selects the data information of the first control from the first notification bar based on the first extension information. The first electronic device sends second notification information to the second electronic device. The second notification information includes the first message content and the data information of the first control. The second notification information indicates the second electronic device to display a second notification bar. The second notification bar includes the first message content and the first control. The first electronic device receives the first identifier sent by the second electronic device in response to a first input for the first control. The first electronic device performs a first operation corresponding to the first control. In this way, a user may further process the notification information based on the second electronic device. This simplifies a user operation.

In a possible implementation, the data information of the first control specifically includes: one or more of a display size of the first control, the first identifier of the first control, description information of the first control, and the first operation corresponding to the first control. In this way, the second electronic device may be enabled to accurately display the first control, helping to simplify a user operation.

In a possible implementation, the first extension information further includes a second identifier of a third control. This helps to efficiently and accurately select, by the first electronic device, the first control to be sent to the second electronic device.

In a possible implementation, the first extension information further includes system component version number information that supports sharing of a notification control with another device.

In a possible implementation, that the first electronic device selects the data information of the first control from the first notification bar based on the first extension information specifically includes: When the first electronic device determines that the system component version number information includes a first version number of a system component in the first electronic device, the first electronic device selects the data information of the first control from the first notification bar based on the first extension information. In this way, the first electronic device may be enabled to determine whether to select and send the first control to the second electronic device, improving efficiency and accuracy of selecting the first control by the first electronic device.

In a possible implementation, before the first electronic device obtains first notification information of a first application, the method further includes: When the first electronic device runs the first application, the first electronic device receives a second input from a user: and the first electronic device generates the first message content based on the second input. In this way, the first electronic device may be enabled to generate the first notification information based on a user input, helping to flexibly and dynamically generate the first notification information.

In a possible implementation, before the first electronic device obtains first notification information of a first application, the method further includes: The first electronic device receives notification prompt content sent by a cloud server and corresponding to the first application: and the first electronic device generates the first message content based on the notification prompt content. In this way, the first electronic device may be enabled to generate the first notification information based on data sent by the cloud server, helping to flexibly and dynamically generate the first notification information.

According to a second aspect, an embodiment of this application provides a communication system. The communication system includes a first electronic device and a second electronic device. The first electronic device establishes a communication connection to the second electronic device. The first electronic device is configured to obtain first notification information of a first application. The first notification information includes first message content, control information corresponding to the first message content, and first extension information. The control information includes data information of a first control and data information of a second control. The first extension information includes a first identifier of the first control. The first electronic device is further configured to display a first notification bar based on the first notification information. The first notification bar includes the first message content, the first control, and the second control. The first electronic device is further configured to select the data information of the first control from the first notification bar based on the first extension information. The first electronic device is further configured to send second notification information to the second electronic device. The second notification information includes the first message content and the data information of the first control. The second electronic device is configured to display a second notification bar based on the second notification information. The second notification bar includes the first message content and the first control. The second electronic device is further configured to send the first identifier to the first electronic device in response to a first input for the first control. The first electronic device is further configured to perform, based on the received first identifier, a first operation corresponding to the first control. In this way, a user may further process the notification information based on the second electronic device. This simplifies a user operation.

In a possible implementation, the data information of the first control specifically includes: one or more of a display size of the first control, the first identifier of the first control, description information of the first control, and the first operation corresponding to the first control. In this way, the second electronic device may be enabled to accurately display the first control, helping to simplify a user operation.

In a possible implementation, the first extension information further includes a second identifier of a third control. This helps to efficiently and accurately select, by the first electronic device, the first control to be sent to the second electronic device.

In a possible implementation, the first extension information further includes system component version number information that supports sharing of a notification control with another device.

In a possible implementation, when the first electronic device is further configured to select the data information of the first control from the first notification bar based on the first extension information, the first electronic device is specifically configured to: when the first electronic device determines that the system component version number information includes a first version number of a system component in the first electronic device, the first electronic device is configured to select the data information of the first control from the first notification bar based on the first extension information. In this way, the first electronic device may be enabled to determine whether to select and send the first control to the second electronic device, improving efficiency and accuracy of selecting the first control by the first electronic device.

In a possible implementation, before the first electronic device is configured to obtain first notification information of a first application, the first electronic device is further configured to: When the first electronic device runs the first application, the first electronic device is configured to receive a second input from a user: and the first electronic device is further configured to generate the first message content based on the second input. In this way, the first electronic device may be enabled to generate the first notification information based on a user input, helping to flexibly and dynamically generate the first notification information.

In a possible implementation, before the first electronic device is configured to obtain first notification information of a first application, the first electronic device is further configured to: The first electronic device is configured to receive notification prompt content sent by a cloud server and corresponding to the first application: and the first electronic device is further configured to generate the first message content based on the notification prompt content. In this way, the first electronic device may be enabled to generate the first notification information based on data sent by the cloud server, helping to flexibly and dynamically generate the first notification information.

According to a third aspect, an embodiment of this application provides an electronic device. The electronic device is a first electronic device and includes one or more processors, one or more memories, a display screen, and a transceiver. The one or more memories are coupled to one or more processors. The one or more memories are configured to store computer program code. The computer program code includes computer instructions. When the one or more processors execute the computer instructions, the first electronic device is enabled to perform the method in any possible implementation in the first aspect. In this way, the user may further process the notification information on the second electronic device based on the data information sent by the first electronic device. This simplifies a user operation.

According to a fourth aspect, an embodiment of this application provides a computer storage medium, including computer instructions. When the computer instructions are run on a first electronic device, the first electronic device is enabled to perform the method in any possible implementation in the first aspect. In this way, the user may further process the notification information on the second electronic device based on the data information sent by the first electronic device. This simplifies a user operation.

According to a fifth aspect, an embodiment of this application provides a computer program product. When the computer program product is run on a first electronic device, the first electronic device is enabled to perform the method in any possible implementation in the first aspect. In this way, the user may further process the notification information on the second electronic device based on the data information sent by the first electronic device. This simplifies a user operation.

BRIEF DESCRIPTION OF DRAWINGS

FIG. 4A and FIG. 4B are a flowchart of a notification method according to an embodiment of this application:

FIG. 5A to FIG. 5C-1 and FIG. 5C-2 are schematic diagrams of a group of user interfaces according to an embodiment of this application.

DESCRIPTION OF EMBODIMENTS

Terms used in the following embodiments of this application are merely intended to describe specific embodiments, but are not intended to limit this application. As used in the specification of this application and the appended claims, the singular expression "a", "an", "the", "the foregoing", "such a", or "this" is intended to also include a plural expression unless otherwise clearly indicated in the context. It should be further understood that, as used in this application, the term "and/or" indicates and includes any and all possible combinations of one or more of the listed items. In embodiments of this application, terms "first" and "second" are used merely for the purpose of description, and shall not be construed as implying or implying relative importance or implying a quantity of indicated technical features. Therefore, a feature limited by "first" or "second" may explicitly or implicitly include one or more of the features. In the descriptions of embodiments of this application, unless otherwise specified, "a plurality of" means two or more.

First, a communication system 10 provided in this application is described.

Figure 1:
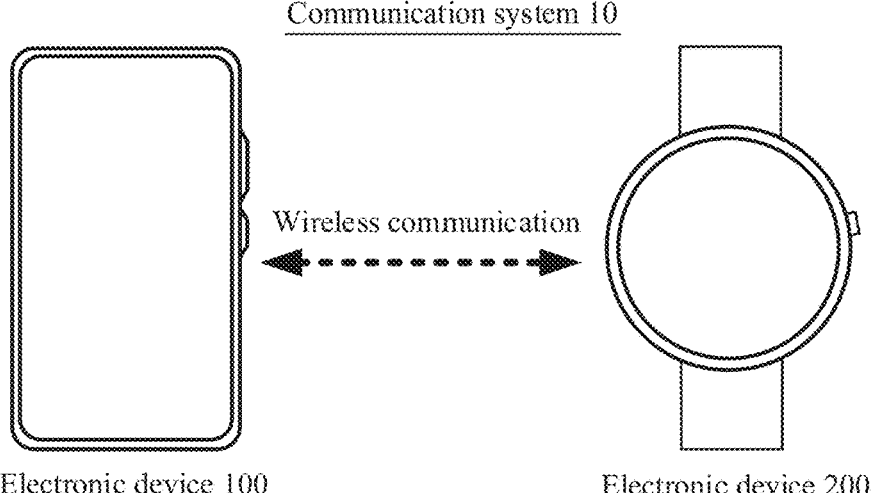
FIG. 1 is a schematic diagram of an architecture of a communication system 10 according to an embodiment of this application.

FIG. 1 shows an example of a schematic diagram of an architecture of the communication system 10 according to an embodiment of this application.

As shown in FIG. 1, the communication system 10 may include an electronic device 100 and an electronic device 200.

The electronic device 100 may be an electronic device such as a mobile phone, a tablet computer, a PC, an ultra-mobile personal computer (UMPC), a netbook, or a personal digital assistant (PDA). A specific type of the electronic device 100 is not limited in any manner in this application.

The electronic device 200 may be an electronic device such as a smart watch, a smart bracelet, a wearable device, an augmented reality (AR)/a virtual reality (VR) device, or the like. A specific type of the electronic device 200 is not limited in any manner in this application.

As shown in FIG. 1, the electronic device 100 and the electronic device 200 may establish a wireless communication connection and transmit data information to each other by using a wireless communication technology. For example, the electronic device 100 may transmit, through the wireless communication connection, various types of notification messages to the electronic device 200, an identifier of a first control (for example, a "Prompt later" control used to interact with a user when the electronic device 200 displays the notification message) to be displayed by the electronic device 200, and the like. The electronic device 200 may receive the foregoing data information transmitted by the electronic device 100 through the wireless communication connection, and may further send data instructions (for example, data instructions including the identifier of the first control) to the electronic device 100 through the wireless communication connection. Specifically, the wireless communication may be one or more wireless communication connections among Bluetooth, Wi-Fi direct, or Wi-Fi softAP.

In a possible implementation, the electronic device 100 may establish a wired communication connection to the electronic device 200 for data exchange. For example, the electronic device 100 and the electronic device 200 may establish a wired connection through a universal serial bus (USB), and transmit data information to each other based on the wired communication connection.

It may be understood that an example of a communication system structure shown in this embodiment of this application does not constitute a specific limitation on the communication system 10. In some other embodiments of this application, the communication system 10 may include more or less electronic devices than electronic devices shown in the figure, or may alternatively include electronic devices whose type is different from a type of electronic devices shown in the figure. For example, the communication system 10 may alternatively include a plurality of electronic devices 200 that establish communication connections with the electronic device 100, such as smart watches, or a plurality of different types of electronic devices, such as displays, tablet computers, and PCs that have a communication function. This is not limited in this application.

Based on the foregoing communication system 10, a notification manner mentioned in this application is described below.

When the electronic device 100 receives and displays various types of notification information (for example, text information, an email, and application notification), the electronic device 200 may receive and display same notification information displayed by the electronic device 100. However, when the electronic device 100 and the electronic device 200 display the same notification information simultaneously, there is no way for the user to perform further processing on the notification information (for example, prompt the notification information later) based on a type of the notification information and the electronic device 200, but only perform interaction on the notification information in the electronic device 100. In addition, the electronic device 200 may perform a universal operation on the notification information (for example, clear the notification information or hide the notification information) only when the electronic device 200 displays the notification information but the electronic device 100 does not display the notification information. Therefore, an operation is extremely not easily performed by the user.

Therefore, an embodiment of this application provides a notification method. When sending notification information to the electronic device 200, the electronic device 100 sends information about one or more controls (for example, an identifier corresponding to each of the one or more controls) related to the notification information. When the electronic device 200 receives an input operation for a first control of one or more controls, the electronic device 200 may send an identifier corresponding to the first control to the electronic device 100. After receiving the identifier corresponding to the first control, the electronic device 100 may determine, based on the identifier, an operation corresponding to the first control, and perform the operation. Therefore, the user may further process the notification information based on the electronic device 200. This simplifies a user operation.

The electronic device 100 provided in this embodiment of this application is described below.

Figure 2:
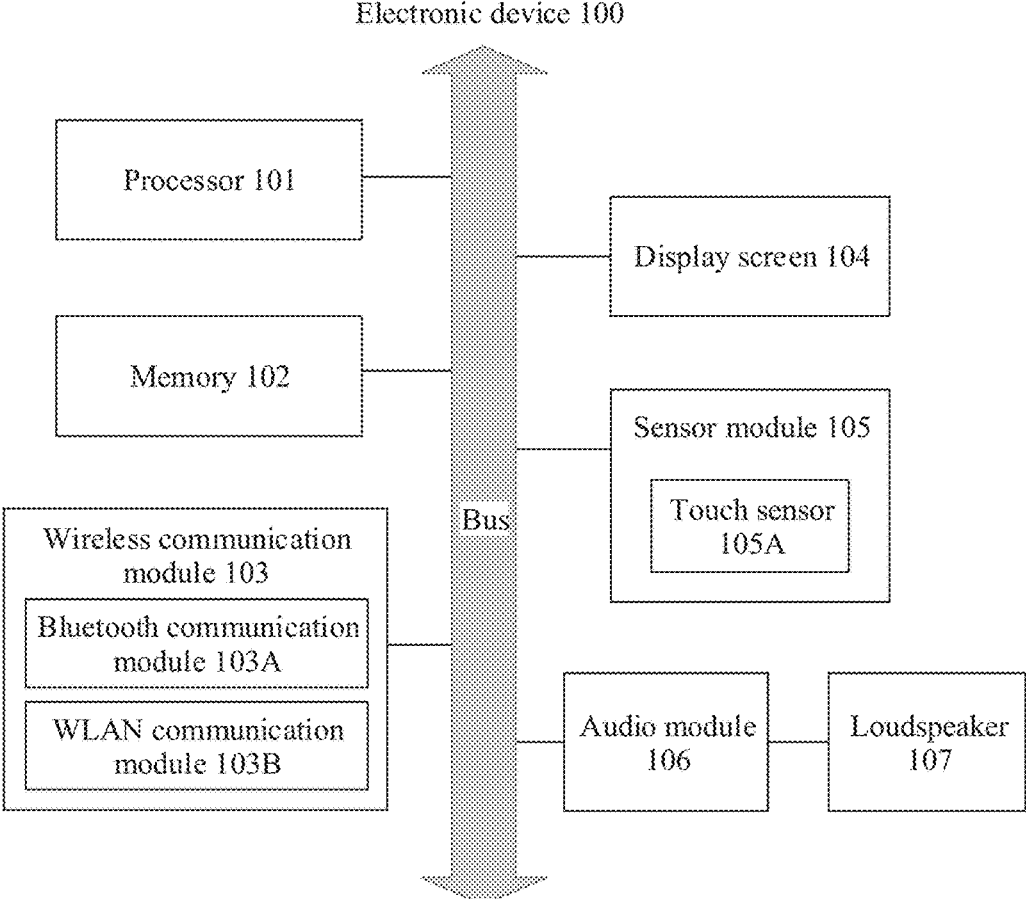
FIG. 2 is a schematic diagram of a hardware structure of an electronic device 100 according to an embodiment of this application.

FIG. 2 shows an example of a schematic diagram of a hardware structure of an electronic device 100 according to an embodiment of this application.

As shown in FIG. 2, the electronic device 100 may include a processor 101, a memory 102, a wireless communication module 103, a display screen 104, a sensor module 105, and the like. The foregoing modules may be connected through a bus or in another manner. In this embodiment of this application, connection through a bus is used as an example.

It may be understood that a structure shown in this embodiment of the present disclosure does not constitute a specific limitation on the electronic device 100. In some other embodiments of this application, the electronic device 100 may alternatively include more or fewer components than those shown in the figure, combine some components, split some components, or have a different component arrangement. The components shown in the figure may be implemented by hardware, software, or a combination of software and hardware.

The processor 101 may include one or more processing units. For example, the processor 101 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be separate devices or may be integrated into one or more processors.

The controller may generate an operation control signal based on instruction operation code and a time sequence signal, to complete control of instruction fetching and instruction execution.

A memory may be further disposed in the processor 101 and is configured to store instructions and data. In some embodiments, the memory in the processor 101 is a cache. The memory may store instructions or data that has been recently used or cyclically used by the processor 101. If the processor 101 needs to use the instructions or the data again, the processor may directly invoke the instructions or the data from the memory. This prevents repeated access and reduces a time for which the processor 101 waits, increasing system efficiency.

In some embodiments, the processor 101 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

In a possible implementation, the electronic device 100 and the electronic device 200 may establish a wired communication connection through a USB interface, and transmit data information to each other based on the wired communication connection.

The memory 102 is coupled to the processor 101, and is configured to store various software programs and/or a plurality of sets of instructions. In specific implementation, the memory 102 may include a volatile memory, for example, a random access memory (RAM); or may include a non-volatile memory, for example, a ROM, a flash memory, a hard disk drive (HDD), or a solid state drive (SSD). The memory 102 may alternatively include a combination of the foregoing types of memories. The memory 102 may store some program code, to enable the processor 101 to call the program code stored in the memory 102, to implement an implementation method in the electronic device 100 according to an embodiment of this application. The memory 102 may store an operating system, for example, an embedded operating system such as uCOS, VxWorks, or RTLinux.

The wireless communication module 103 may include a Bluetooth communication module 103A and a WLAN communication module 103B. In some embodiments, the WLAN communication module 103B may be integrated with another communication module (such as the Bluetooth communication module 103A). The WLAN communication module 103B and/or the Bluetooth module 103A may transmit signals/a signal to detect and scan a device near the electronic device 100. This enables the electronic device 100 to discover the nearby device, such as the electronic device 200, by using one or more wireless communication technologies in Bluetooth or WLAN. The electronic device 100 and the electronic device 200 may establish a wireless communication connection by using one or more wireless communication technologies such as WLAN and Bluetooth, and perform data transmission and data receiving based on the wireless communication connection. The electronic device 100 may transmit, to the electronic device 200, data (for example, various types of notification information and an identifier of a first control that is to be displayed by the electronic device 200) based on one or more wireless communication technologies in the Bluetooth communication module 103A or the WLAN communication module 103B. The electronic device 100 may also obtain, through the foregoing wireless communication connection, data instructions (for example, data instructions including the identifier of the first control) sent by the electronic device 200. The Bluetooth communication module 103A may provide one or more Bluetooth communication solutions including classic Bluetooth (basic rate/enhanced data rate, BR/EDR) or Bluetooth low energy (BLE). The WLAN communication module 103B may provide one or more WLAN communication solutions including wireless fidelity direct (Wi-Fi direct), wireless fidelity local area networks (Wi-Fi LANs), or wireless fidelity software access point (Wi-Fi softAP). The wireless communication module 103 may receive an electromagnetic wave through an antenna (not shown in FIG. 2), perform frequency modulation and filtering processing on an electromagnetic wave signal, and send a processed signal to the processor 101. The wireless communication module 103 may further receive a to-be-sent signal from the processor 101, perform frequency modulation and amplification on the signal, and convert the signal into an electromagnetic wave for radiation through the antenna.

In some embodiments, the wireless communication module 103 may further provide wireless communication solutions applied to the electronic device 100, including a global navigation satellite system (GNSS), a frequency modulation (FM), a near field wireless communication technology (NFC), and an infrared (IR) technology.

The display screen 104 may be used to display an image, a video, and the like. The display screen 104 may include a display panel. The display panel may be a liquid crystal display (LCD), an organic light-emitting diode (OLED), an active-matrix organic light-emitting diode (AMOLED), a flex light-emitting diode (FLED), a mini-LED, a micro-LED, a micro-OLED, a quantum dot light-emitting diode (QLED), or the like. In some embodiments, the electronic device 100 may include 1 or N display screens 104, where N is a positive integer greater than 1.

The sensor module 105 may include a touch sensor 105A and the like. The touch sensor 105A may also be referred to as a "touch device". The touch sensor 105A may be disposed at the display screen 104. The touch sensor 105A and the display screen 104 form a touchscreen, which is also referred to as a "touch control screen". The touch sensor 105A may be configured to detect a touch operation on or near the touch sensor. Optionally, the sensor module 105 may further include a gyroscope sensor (not shown in FIG. 2), an acceleration sensor (not shown in FIG. 2), and the like. The gyroscope sensor may be configured to determine a motion posture of the electronic device 100. In some embodiments, the electronic device 100 may determine an angular velocity of the electronic device 100 around three axes (namely, x, y, and z axes) through the gyroscope sensor. The acceleration sensor may be configured to detect an acceleration of the electronic device 100 in various directions (generally x, y, and z axes). When the electronic device 100 is still, a magnitude and a direction of gravity may be detected.

The audio module 106 may be configured to convert digital audio information into an analog audio signal for output, and may also be configured to convert an analog audio input into a digital audio signal. The audio module 106 may further be configured to encode and decode an audio signal. In some embodiments, the audio module 106 may further be disposed in the processor 101, or some functional modules of the audio module 106 are disposed in the processor 101.

The loudspeaker 107 may also be referred to as a "speaker", and is configured to convert an audio electrical signal into a sound signal. The electronic device 100 may listen to music or answer a hands-free call through the loudspeaker 107.

Optionally, the electronic device 100 may further include a mobile communication module (not shown in FIG. 2). The mobile communication module may provide a solution applied to the electronic device 100 for wireless communication such as 2G/3G/4G/5G.

An example of the electronic device 200 provided in an embodiment of this application is described below.

Figure 3:
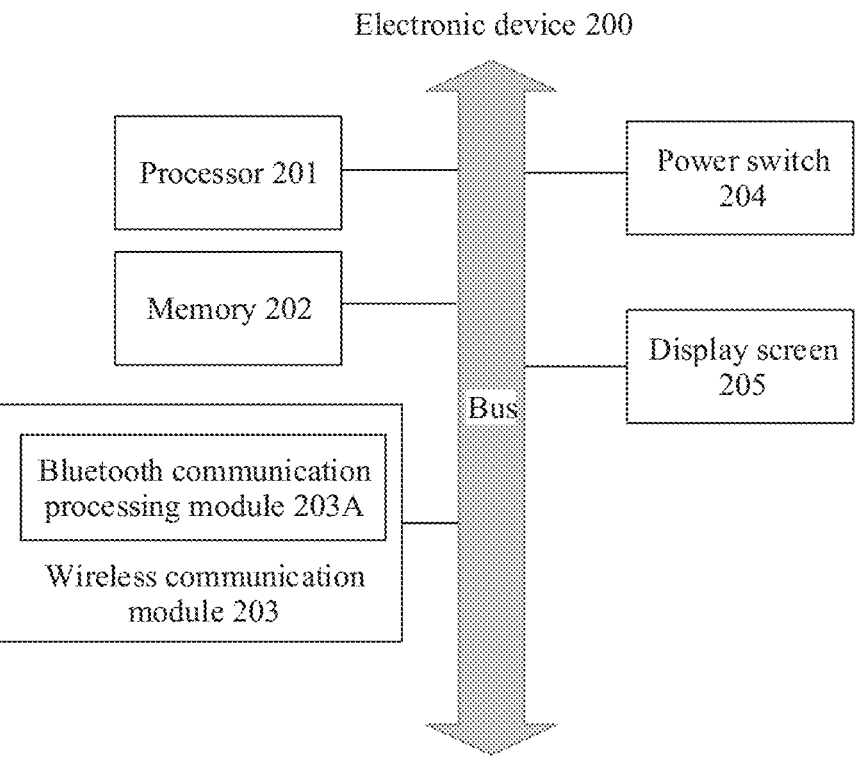
FIG. 3 is a schematic diagram of a hardware structure of an electronic device 200 according to an embodiment of this application.

FIG. 3 shows an example of a schematic diagram of a hardware structure of an electronic device 200 according to an embodiment of this application.

As shown in FIG. 3, for example, the electronic device 200 may include a processor 201, a memory 202, a wireless communication module 203, a power switch 204, a display screen 205, and the like. The foregoing modules may be connected through a bus or in another manner. In this embodiment of this application, connection through a bus is used as an example.

The processor 201 may be configured to read and execute computer-readable instructions. In specific implementation, the processor 201 may mainly include a controller, an arithmetic unit, and a register. The controller is mainly responsible for decoding instructions and sending a control signal for an operation corresponding to the instructions. The arithmetic unit is mainly responsible for storing a register operand, an intermediate operation result, and the like that are temporarily stored during instruction execution. In specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse data information (for example, an identifier corresponding to the first control) received by the wireless communication module 203. The processor 201 may respond based on the data information and perform a corresponding operation (for example, display a first control). The processor 201 may further be configured to generate a signal, such as a Bluetooth signal, sent externally by the wireless communication module 203.

The memory 202 is coupled to the processor 201, and is configured to store various software programs and/or a plurality of sets of instructions. In specific implementation, the memory 202 may include a high-speed random access memory, and may also include a nonvolatile memory such as one or more disk storage devices, a flash device, or another nonvolatile solid-state storage device. The memory 202 may further store a communication program. The communication program may be used to communicate with the electronic device 100 or another electronic device.

The wireless communication module 203 may include a Bluetooth communication module 203A or the like. The electronic device 200 may receive or transmit a wireless signal through one or more in the Bluetooth communication module 203A to establish a wireless communication connection to the electronic device 100. The electronic device 200 may obtain, through the wireless communication connection, data (for example, various types of notification information and a mark of a control that is to be displayed by the electronic device 200) transmitted by the electronic device 100, and may also send data instructions (for example, data instructions including the mark of the first control) to the electronic device 100 through the wireless communication connection. The Bluetooth communication module 203A may provide one or more Bluetooth communication solutions including classic Bluetooth (basic rate/enhanced data rate, BR/EDR) or Bluetooth low energy (BLE). Optionally, the wireless communication module 203 may also include a WLAN communication module (not shown in FIG. 3). The WLAN communication module may provide one or more WLAN communication solutions of Wi-Fi direct, Wi-Fi LAN, or Wi-Fi softAP. In some embodiments, the WLAN module may be integrated with the Bluetooth communication module 203A. The electronic device 200 may establish a wireless communication connection to the electronic device 100 by using a wireless communication technology provided by the WLAN module, and perform data interaction with the electronic device 200 based on the wireless communication connection.

The power switch 204 may be configured to control a power supply to supply power to the electronic device 200.

The display screen 205 may be used to display an image, a video, a control, text information, and the like. The display screen 205 may include a display panel. The display panel may be a liquid crystal display (LCD), an organic light-emitting diode (OLED), an active-matrix organic light-emitting diode (AMOLED), a flex light-emitting diode (FLED), a mini-LED, a micro-LED, a micro-OLED, a quantum dot light-emitting diode (QLED), or the like. In some embodiments, the electronic device 200 may include 1 or N display screens 205, where N is a positive integer greater than 1.

Optionally, the electronic device 200 may include a touch sensor, and the touch sensor may also be referred to as a "touch device." The touch sensor may be disposed at the display screen 205, and the touch sensor and the display 205 form a touchscreen, which may also be referred to as a "touch control screen". The touch sensor may be configured to detect a touch operation on or near the touch sensor.

Optionally, the electronic device 200 may include one or more physical buttons. The one or more physical buttons may receive an input operation (for example, pressing the physical button) by a user on the button. In response to the input operation, the electronic device 200 may perform a corresponding operation of a control displayed on the display screen corresponding to the physical button.

Optionally, the electronic device 200 may further include a USB interface. The electronic device 200 and the electronic device 100 may establish a wired communication connection through the USB interface, and transmit data information through the wired communication connection.

It may be understood that the electronic device 200 shown in FIG. 3 is only an implementation of this embodiment of this application, and does not constitute a specific limitation on the electronic device 200. For example, the electronic device 200 may be a smart watch, and the electronic device 200 may further include a watch band and a watch face. The watch face may include a display screen 205 for displaying an image, a video, a control, text information, and the like. The watch band may be configured to fasten the electronic device 200 to a limb of a human body for ease of wearing. In actual application, the electronic device 200 may further include more or fewer components than those shown in the figure, which is not limited herein.

A notification method provided in an embodiment of this application is described below.

Figure 4A:
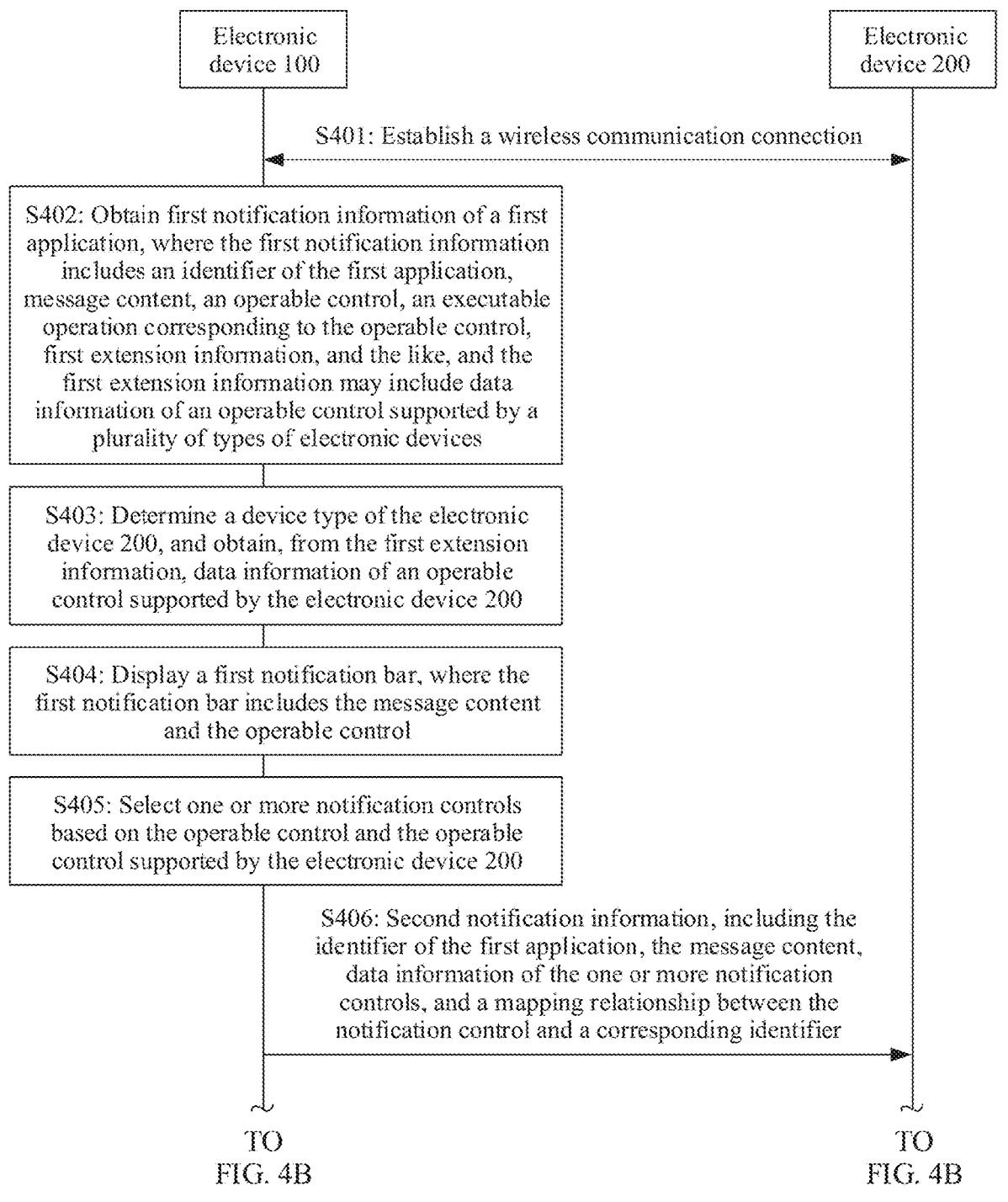

FIG. 4A and FIG. 4B show an example of a flowchart of a notification method according to an embodiment of this application.

As shown in FIG. 4A and FIG. 4B, for example, an electronic device 100 is a mobile phone, and an electronic device 200 is a smart watch. A specific procedure of the method may include the following steps.

S401: The electronic device 100 establishes a wireless communication connection to the electronic device 200.

Specifically, the electronic device 100 and the electronic device 200 may establish a wireless communication connection by using one or more Bluetooth communication solutions that are provided by a Bluetooth communication module and that include classic Bluetooth (basic rate/enhanced data rate, BR/EDR) or Bluetooth low energy (BLE), and perform data transmission and data receiving based on the wireless communication connection.

Optionally, the electronic device 100 and the electronic device 200 may further establish a wireless communication connection by using one or more WLAN communication solutions that are provided by the WLAN communication module and that include Wi-Fi direct, Wi-Fi LAN, or Wi-Fi softAP, and perform data transmission and data receiving based on the wireless communication connection. This is not limited in this application.

S402: The electronic device 100 obtains first notification information of a first application, where the first notification information may include an identifier of the first application, message content, an operable control corresponding to the message content, an executable operation corresponding to the operable control, first extension information, and the like. The first extension information may include data information of an operable control supported by a plurality of types of electronic devices.

The message content in the first notification information may be obtained by the electronic device 100 from a server, or may be obtained from a user input received by the electronic device 100. This is not limited in this application.

The data information that is of the operable control supported by the plurality types of electronic devices and that is included in the first extension information may include an identifier of the operable control supported by the plurality of types of electronic devices, and may also include attribute information (for example, a height attribute of the control, a width attribute of the control, and description information of the control) of the operable control supported by the plurality of types of electronic devices. The description information of the control may include prompt information of the control, picture information of the control, and/or the like. The first extension information may be preset by a first application and stored in the electronic device 100.

For example, in this embodiment of this application, identifiers of operable controls supported by various types of electronic devices in the first extension information in the first application may be shown in Table 1.

TABLE 1

| Type of an electronic device | Supported operable control | Identifier |
| --- | --- | --- |
| Smart watch | "Prompt later" | 1 |
|  | "Got it" | 3 |
|  | "Marked as completed" | 4 |
| Large screen | "Prompt later" | 1 |
|  | "Join a meeting" | 2 |
|  | "Got it" | 3 |
|  | "Marked as completed" | 4 |

It may be known from Table 1 that, when the type of the electronic device 200 is the smart watch, controls supported by the electronic device 200 may include "Prompt later", "Got it", "Marked as completed", and the like. A value of a corresponding identifier of the "Prompt later" control may be "1". A value of a corresponding identifier of the "Got it" control may be "3". A value of a corresponding identifier of the "Marked as completed" may be "4". When a type of the electronic device 200 is a large-screen device, operable controls supported by the electronic device 200 may include "Prompt later", "Join a meeting", "Got it", "Marked as completed", and the like. A value of a corresponding identifier of the "Prompt later" control may be "1". A value of a corresponding identifier of the "Join a meeting" control may be "2". A value of a corresponding identifier of the "Got it" control may be "3". A value of a corresponding identifier of the "Marked as completed" may be "4".

It should be noted that Table 1 is only used to explain this application. In actual application, Table 1 may alternatively include identifiers of operable controls supported by various types of electronic devices that are more than, less than, or different from the identifiers shown in Table 1, which is not limited in this application.

S403: The electronic device 100 determines a device type of the electronic device 200 based on the wireless communication connection. The first application in the electronic device 100 may obtain, based on the device type of the electronic device 200, the data information of the operable control supported by the electronic device 200 from the first extension information.

For example, the electronic device 100 is a mobile phone, and the electronic device 200 is a smart watch. The electronic device 100 may establish a Bluetooth communication connection to the electronic device 200. The electronic device 100 may determine, from the data information sent by the electronic device 200 when the Bluetooth communication connection is established, that the type of the electronic device 200 is a smart watch. Then the electronic device 100 may obtain the data information of the operable control supported by the electronic device 200 (that is, the smart watch) from the first extension information. For example, operable controls that may be obtained by the electronic device 100 and supported by the electronic device 200 include "Prompt later", "Got it", "Marked as completed", and the like. A value of a corresponding identifier of the "Prompt later" control may be "1". A value of a corresponding identifier of the "Got it" control may be "3". A value of a corresponding identifier of the "Marked as completed" may be "4".

In another possible implementation, the first application is preset with data information (as shown in Table 1) of the operable controls supported by various types of electronic devices. When the electronic device 100 establishes a wireless communication connection to the electronic device 200 and determines the device type of the electronic device 200, the first application may obtain the data information of the operable controls supported by the electronic device 200, and pack, as the first extension information, the data information of the operable controls supported by the electronic device 200, and sends the first extension information along with the first notification information. In other words, in the implementation, the first extension information includes only the data information of operable controls supported by the electronic device 200, and does not include the data information of operable controls supported by a plurality of types of electronic devices as shown in step S401.

It should be noted that the foregoing control is used only as an example for explaining this application. Different types of first applications may include different controls. For example, in a "Calendar" application, an "Agree" control, a "Disagree" control, and the like may be included. In a "Notes" application, an "OK" control, a "Cancel" control, and the like may be included. This is not limited in this application.

S404: The electronic device 100 displays a first notification bar, where the first notification bar may include the message content and the operable control corresponding to the message content.

Figure 5A:
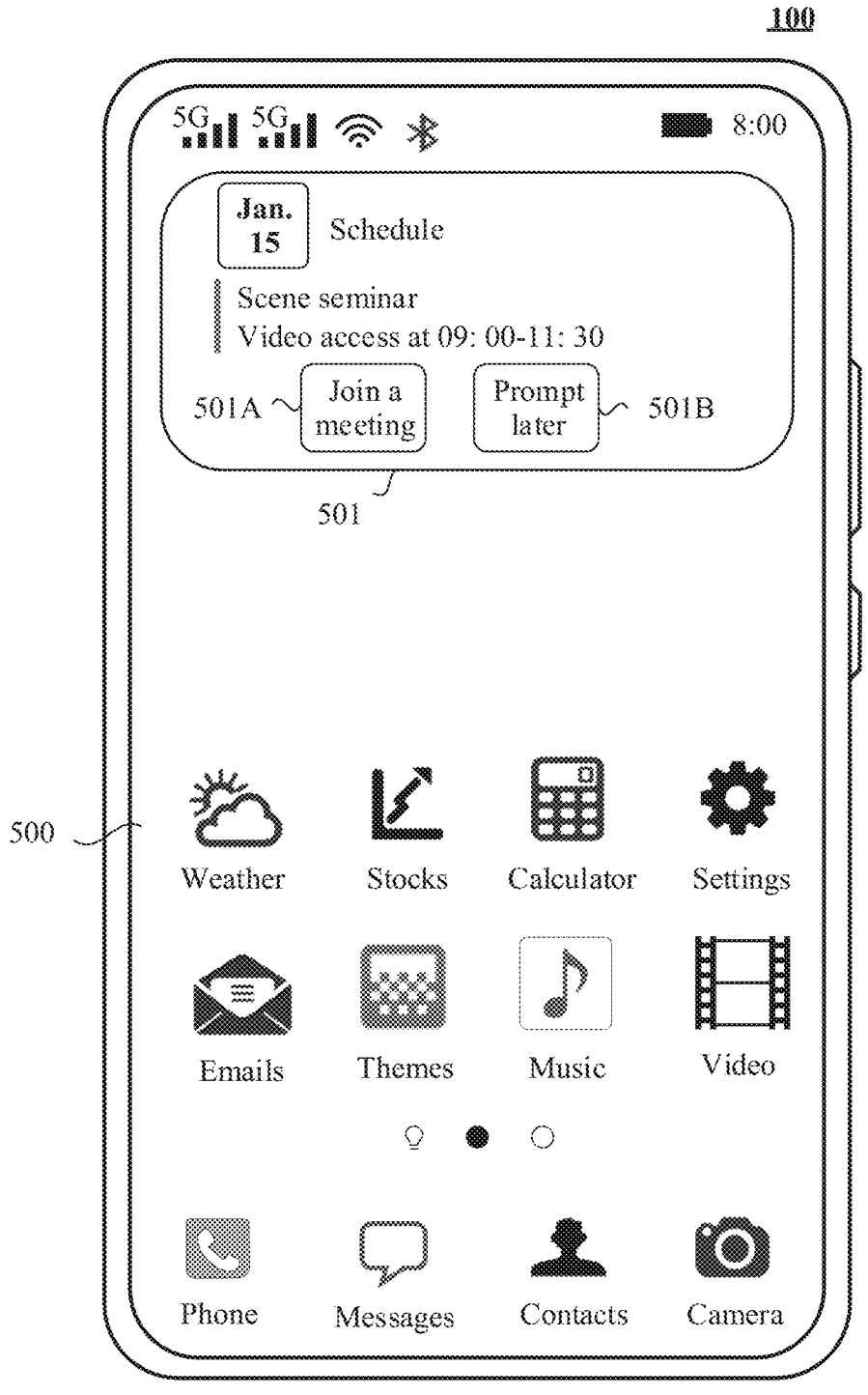

For example, as shown in FIG. 5A, the electronic device 100 may display a user interface 500. The user interface 500 may display one or more application icons and a notification bar 501 (also referred to as the first notification bar). The one or more application icons may include a weather application icon, a stock application icon, a calculator application icon, a settings application icon, a mail application icon, a theme application icon, a music application icon, a video application icon, and the like. The notification bar 501 may include message type prompt information, the message content, a "Join a meeting" control 501A (also referred to as a second control), a "Prompt later" control 501B (also referred to as a first control), and the like. The message type prompt information may prompt the user a type of the message content in the notification bar. The message type prompt information may be text information "schedule". The message type prompt information is not limited to the text information. An indicator of the message type may also be an icon, a voice output by the electronic device 100, or another type of prompt information. The message content may be text information "Scene seminar", "Video access at 09:00-11:30", and the like. The "Join a meeting" control 501A and the "Prompt later" control 501B may be used for a user to select an operation to be performed by the electronic device 100. The electronic device 100 may perform an operation corresponding to the "Join a meeting" control

501A or the "Prompt later" control 501B in response to a touch operation (such as tapping) acting on the "Join a meeting" control 501A or the "Prompt later" control 501B.

It should be noted that a value of an identifier of the "Join a meeting" control 501A may be "2", and the control 501A may not be an operable control supported by electronic device 200. Correspondingly, the value "2" of the identifier corresponding to the control 501A does not exist in Table 1. In other words, an identifier corresponding to an operable control supported by the electronic device 200 does not include the identifier corresponding to the control 501A. A value of an identifier corresponding to the "Prompt later" control 501B (also referred to as the first control) may be"1". The control 501B may be an operable control supported by the electronic device 200. Correspondingly, the value "1" of the identifier corresponding to the control 501B exists in Table 1. In other words, an identifier corresponding to an operable control supported by the electronic device 200 includes the identifier corresponding to the control 501B.

Optionally, the user interface 500 may further display a status bar, a page indicator, and a tray icon area. The status bar may include one or more signal strength indicators of a mobile communication signal (also referred to as a honeycomb signal), a signal strength indicator of a wireless fidelity (Wi-Fi) signal, a Bluetooth icon, a battery status indicator, a time indicator, and the like. The page indicator may indicate a position relationship between a currently displayed page and another page. The tray icon area includes a plurality of tray icons (such as a dialing application icon, an information application icon, a contact application icon, and a camera application icon). A tray icon remains displayed during page switching. The Bluetooth icon indicates the user that the electronic device 100 and the electronic device 200 establish a wireless communication connection through Bluetooth. The foregoing page may further include a plurality of application icons and page indicators. The page indicator may not be a part of the page and may exist separately. The foregoing picture icon is alternatively optional. This is not limited in this embodiment of this application.

S405: The electronic device 100 may obtain the identifier of the first application, data information of the operable control corresponding to the message content, the executable operation corresponding to the operable control, and the like. The data information of the control may include, for example, an identifier of the control, a length attribute of the control, a height attribute of the control, description information of the control, and/or the like. The description information of the control may include text prompt information of the control (for example, text information, such as "Prompt later" or "Got it", displayed on the control for prompting a control function), picture information of the control, and/or the like. The electronic device 100 may select, based on the identifier of the operable control and an identifier of an operable control that is supported by the electronic device 200, one or more notification controls to be pushed to the electronic device 200.

For example, the electronic device 100 may obtain the identifier corresponding to the "Join a meeting" control 501A (also referred to as the second control), the identifier corresponding to the "Prompt later" control 501B (also referred to as the first control), information about the control 501A, and information about the control 501B that are included in the notification bar 501 displayed in the user interface 500. The value of the identifier corresponding to the "Join a meeting" control 501A is "2". The value of the identifier corresponding to the "Prompt later" control 501B is "1". The electronic device 100 may perform an operation on obtaining an intersection set based on the identifier (for example, as shown in Table 1) corresponding to the operable control supported by the electronic device 200, the identifier corresponding to the obtained control 501A, and the identifier corresponding to the obtained control 501B in step S410. It may be learned that the identifier (for example, shown in Table 1) corresponding to the operable control supported by the electronic device 200 includes the value "1" of the identifier corresponding to the control 501B, but does not include the value "2" of the identifier corresponding to the control 501A. Therefore, the electronic device 100 selects the "Prompt later" control 501B to be pushed to the electronic device 200.

S406: The electronic device 100 sends second notification information, where the second notification information may include the identifier of the first application, the message content, data information of the selected one or more notification controls, and a mapping relationship between a notification control and a corresponding identifier.

The data information of the one or more notification controls may include an identifier of the notification control, a length attribute of the notification control, a height attribute of the notification control, text prompt information of the notification control, and the like.

For example, the mapping relationship between a notification control and a corresponding identifier may be a mapping relationship between the "Prompt later" control 501B and a corresponding identifier "1" that are selected based on Table 1.

Specifically, the electronic device 100 may send the second notification information to the electronic device 200 by using one or more wireless communication technologies in Bluetooth or WLAN.

In an implementation, the first extension message may further include a version number of a system component (for example, configured to select and send one or more notification controls to a Synergy component of the electronic device 200). The electronic device 100 may determine, before selecting the one or more notification controls to be pushed to the electronic device 200, whether the version number of the system component is a preset version number. When the electronic device 100 determines that the version number of the system component is not the preset version number, the electronic device 100 does not perform the operation shown in step S405. To be specific, the electronic device 100 does not perform a process in which the one or more notification controls to be pushed to the electronic device 200 are selected.

In another implementation, the electronic device 100 may receive and respond to a user input, to determine whether to perform the operation in which the notification control to be pushed to the electronic device 200 is selected and sent.

S407: The electronic device 200 displays a second notification bar based on the second notification information, where the second notification bar may include the message content and the one or more notification controls sent in step S406.

Figure 5B:
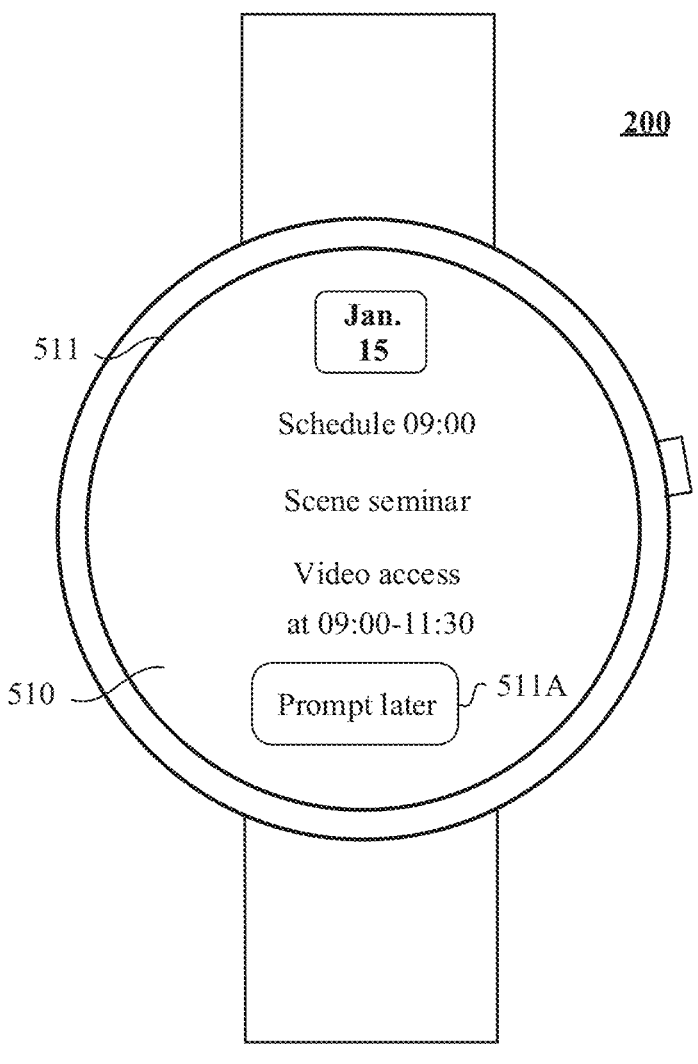

For example, as shown in FIG. 5B, the electronic device 200 may display a user interface 510. A notification bar 511 (also referred to as the second notification bar) may be displayed in the user interface 510. The notification bar 511 may include message type prompt information, the message content, the "Prompt later" control 511A (also referred to as the first control), and the like. The message type prompt information may prompt the user a type of the message content in the notification bar. The message type prompt information may be text information "Schedule 09:00". The message type prompt information is not limited to the text information. An indicator of the message type may also be an icon, a voice output by the electronic device 200, or another type of prompt information. The message content may be text information "Scene seminar", "Video access at 09:00-11:30", and the like. The "Prompt later" control 511A may be used to listen and obtain a touch operation (for example, tapping) of a user acting on the control.

S408: The electronic device 200 receives a first input for a first control of the one or more notification controls.

S409: The electronic device 200 sends a first identifier of the first control in response to the first input based on the mapping relationship in step S406.

Figures 1, 5C:
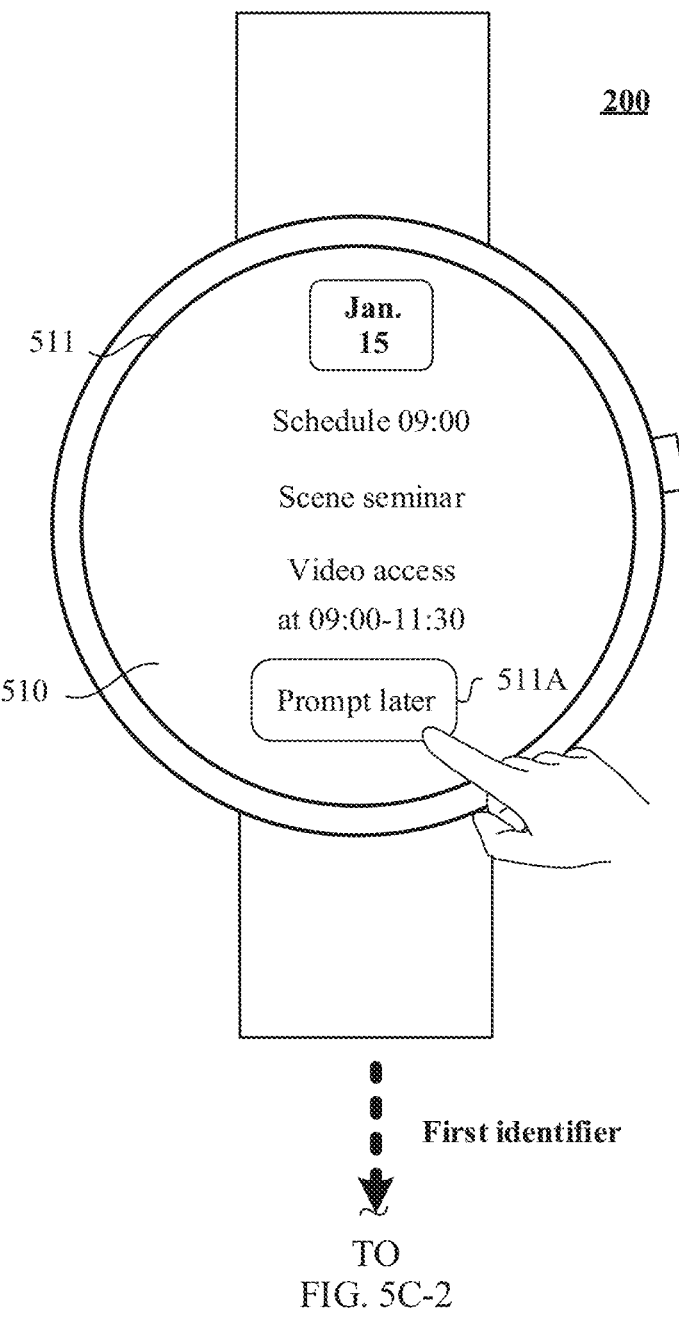
Figures 2, 5C:
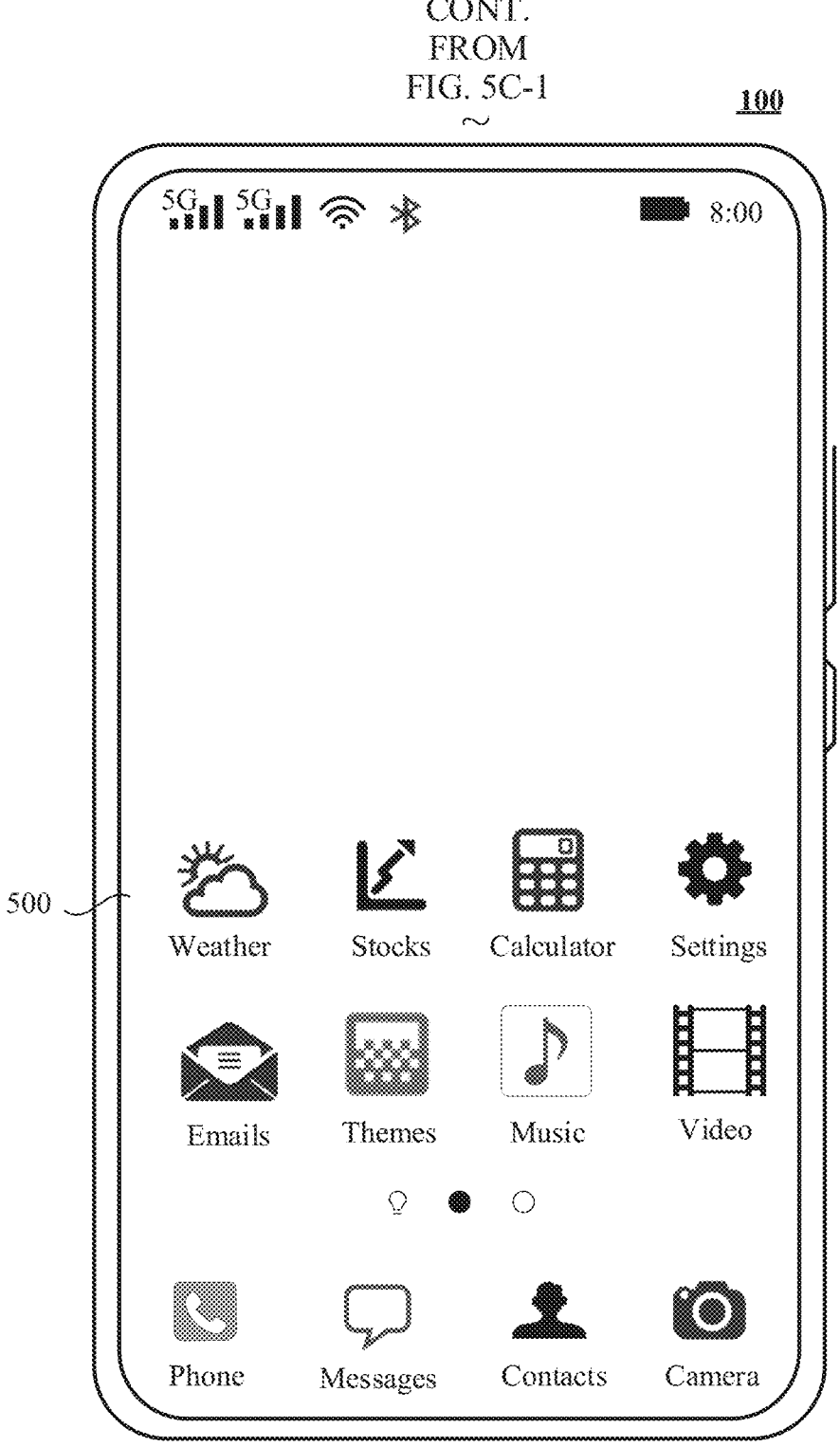

For example, as shown in FIG. 5C-1 and FIG. 5C-2, the electronic device 200 may receive a touch operation (also referred to as the first input, such as tapping) on the "Prompt later" control 511A (also referred to as the first control). In response to the touch operation, the electronic device 200 may send the value "1" of the identifier (also referred to as the first identifier) corresponding to the "Prompt later" control 511A to the electronic device 100 by using one or more wireless communication technologies in Bluetooth or WLAN.

S410: The electronic device 100 receives the identifier of the first control sent by the electronic device 200, and the electronic device 100 determines a first operation corresponding to the first control based on the identifier of the first control.

For example, when the electronic device 100 receives the value "1" of the identifier corresponding to the "Prompt later" control 511A (also referred to as the first control), the electronic device 100 may determine, based on the identifier, an operation (also referred to as the first operation) corresponding to the "Prompt later" control 511A, namely, an operation (also referred to as the first operation) corresponding to the "Prompt later" control 501B on the user interface 500.

S411: The electronic device 100 performs the first operation.

For example, as shown in FIG. 5C-1 and FIG. 5C-2, after the electronic device 100 determines, based on the identifier of the "Prompt later" control 511A, the operation (also referred to as the first operation) corresponding to the control, the electronic device 100 may perform the operation. For example, the electronic device 100 no longer displays the notification bar 501, and displays the first notification bar in the electronic device 100 again after a specified time point (for example, in ten minutes). For a description of the first notification bar, refer to the description in step S404. The details are not described herein again.

In some embodiments, the electronic device 100 may receive a notification control identifier sent by a plurality of electronic devices 200. The electronic device 100 may determine and perform a corresponding operation based on the notification control identifier.

It should be noted that a sequence of the foregoing steps is merely used to explain an example of a specific procedure of the notification method, and does not specifically constitute a limitation on this application.

It should be noted that an example of the foregoing user interface is merely used to explain this application, and does not constitute a limitation on this application.

In some embodiments, the first application may be preset with data information (as shown in Table 1) of operable controls supported by various types of electronic devices. When the electronic device 100 establishes a wireless communication connection to the electronic device 200, and a device type of the electronic device 200 is determined, the first application may obtain the data information of the operable control supported by the electronic device 200. When the first application sends the first notification information, the first application may obtain, based on an operable control corresponding to the message content and an operable control supported by the electronic device 200 (for example, an interaction set obtained from the operable control corresponding to the message content and the operable control supported by the electronic device 200), a control that may be sent to the electronic device 200 and that is corresponding to the message content, and packs data information of the control into first extension information, and sends the first extension information along with the first notification information. The electronic device 100 may send the data information of the control to the electronic device 200 based on the first extension information.

To be specific, the first extension information includes an operable control that is in the message content and that may be sent to the electronic device 200, rather than all controls that are supported by the electronic device 200. For example, the electronic device 100 is a mobile phone, the electronic device 200 is a smart watch, and the notification bar 501 is shown in FIG. 5A. In this case, the first extension information includes data information of the "Prompt later" control 501B, rather than all controls "Prompt later", "Got it", and "Marked as completed" that are supported by the smart watch shown in Table 1.

In some embodiments, message content of the first notification information in the first application may be a local message that does not need to rely on the server to send data information. For example, a clock application is the first application. Message content of first notification information in the clock application may be a received user input, for example, receiving a specified time point (for example, 7:00 a.m.) entered by a user, and the electronic device 100 rings an alarm clock at the specified time point. In this case, when the electronic device 100 receives an identifier of the first control (for example, a "Prompt again in ten minutes" control or a "Stop" control) sent by the electronic device 200, a first operation determined and performed by the electronic device 100 based on the identifier of the first control may be a local operation (for example, a "Prompt again in ten minutes" operation or a "Stop" operation) that is performed without relying on interaction with the server.

In some embodiments, the message content of the first notification information in the first application may be an online message notification that needs to rely on the server to send data information. For example, a news application is the first application. Message content of first notification information in the news application may be notification information sent by the server. In this case, when the electronic device 100 receives the identifier of the first control (for example, a "View complete news" control) sent by the electronic device 200, a first operation determined and performed by the electronic device 100 based on the first control may be an operation (for example, an operation of sending complete news information by the server and displaying the news information on a display screen, to enable the user to view the complete news) to be performed by interacting with the server. This is not limited in this application.

A system architecture provided in an embodiment of this application is described below.

Figure 6:
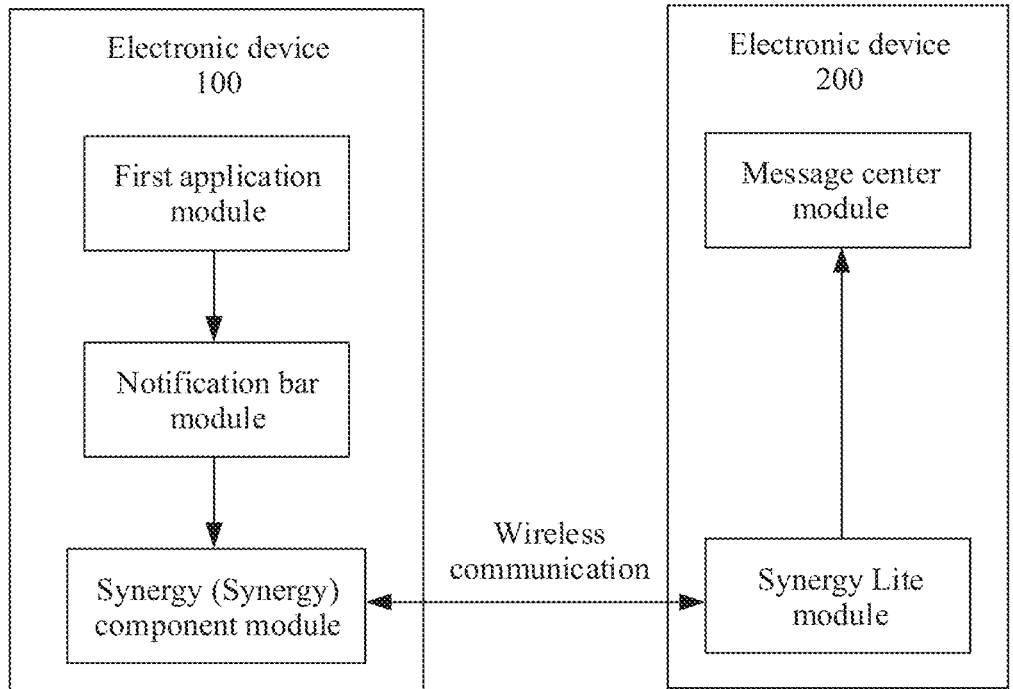
FIG. 6 is a schematic diagram of a system architecture according to an embodiment of this application.

Refer to FIG. 6. For example, the electronic device 100 is a mobile phone, the electronic device 200 is a smart watch, and the electronic device 100 and the electronic device 200 perform wireless communication by using the BLE. FIG. 6 shows an example of a schematic diagram of a system architecture according to an embodiment of this application.

As shown in FIG. 6, the electronic device 100 may include a first application module, a notification bar module, and a Synergy component module. The electronic device 200 may include a Synergy Lite module, a message center module, and the like.

First extension information may be preset and stored in the first application module in the electronic device 100. For a description of the first extension information, refer to the description of step S402 in the embodiment shown in FIG. 4A and FIG. 4B. The details are not described herein again. In a possible implementation, a format of the first extension information may be shown in the following code:

```
Bundle bundle=new Bundle( );
Bundle.putInt("synergy.version", 1);
Bundle.putString("synergy.actionids", [1,3,4]);
notification.extras=bundle;
```

"Bundle.putInt("synergy.version", 1)" indicates a version number of a system component included in the first extension information. The Synergy component module in the electronic device 100 may determine, based on the version number of the system component, whether one or more notification controls are to be selected and pushed to the electronic device 200. In another possible implementation, the code of the first extension information may not include the version number of the system component. This is not limited in this application. "Bundle.putString("synergy.actionids", [1,3,4])" indicates an identifier of an operable control that may be pushed to the electronic device 200. In the example, values of identifiers of operable controls that may be pushed by the electronic device 100 to the electronic device 200 are "1", "3", and "4", namely, the "Prompt later" control, the "Got it" control, and the "Marked as completed" control that are correspondingly shown in Table 1.

It should be noted that the foregoing code format is used to merely explain this application, and shall not constitute any limitation.

The first application module may further send data information to the notification bar module, and send the first notification information including the first extension information to the notification bar module, to enable the notification bar module to display the first notification bar based on the first notification information. For a description of the first notification information and the first notification bar, refer to the foregoing descriptions of step S402 and step S404 in the foregoing embodiment shown in FIG. 4A and FIG. 4B. The details are not described herein again.

When detecting that the notification bar module displays the first notification bar, the Synergy component module may obtain data information (for example, an identifier of a first application, data information of an operable control corresponding to message content, and an executable operation corresponding to the operable control) in the first notification bar from the notification bar module. For specific data information in the first notification bar, refer to the foregoing description of step S405 in the embodiment shown in FIG. 4A and FIG. 4B. The details are not described herein again. The Synergy component module may select, based on the data information in the first notification bar, a notification control to be sent to the electronic device 200. For a process in which selecting of the notification control to be sent to the electronic device 200 is performed, refer to the foregoing description of step S405 in the embodiment shown in FIG. 4A and FIG. 4B. The details are not described herein again. In a possible implementation, code executed in the selection process may be as follows:

```
Notification notification;
...
Bundle bundle=notification.Extras;    //obtain first extension
information.
int version=bundle.getInt;    //obtain a version number of a system
component included in the first extension information.
    if(version>=999)
    {
    Return;
    } //determine whether the version number of the system component is
a preset version number; and if a determining result is no, skipping
performing an operation of selecting a notification control to be sent to the
electronic device 200.
    String strActionL1=...; //obtain an identifier of an operable control
in the first notification bar.
    String strActionL2=bundle.getString( );//obtain an identifier of an
operable control supported by the electronic device 200 and included in
the first extension information.
    ...;    //compare the identifier of the operable control in the first
notification bar with the identifier of the operable control supported by the
electronic device 200, and select an intersection set to select a notification
control to be pushed to the electronic device 200.
```

Then the Synergy component module may send, the electronic device 200 by using a BLE wireless communications technology, second notification information including that the notification control of the electronic device 200 is to be sent. For a specific process, refer to the foregoing description of step S406 in the embodiment shown in FIG. 4A and FIG. 4B. The details are not described herein again.

After the electronic device 200 receives the second notification information, the Synergy Lite module in the electronic device 200 may parse out the second notification information, and send parsed second notification information to the message center module. Then the message center module may display the second notification bar based on the parsed second notification information. For a description of the second notification bar, refer to the foregoing description of step S407 in the embodiment shown in FIG. 4A and FIG. 4B. The details are not described herein again.

When the electronic device 200 receives an input operation (for example, tapping) for the first control of one or more notification controls in the second notification bar, the Synergy Lite module may send an identifier of the first control to the electronic device 100 by using the BLE wireless communication technology.

The Synergy component module in the electronic device 100 may receive the identifier of the first control sent by the electronic device 200. The Synergy component module may determine, based on the identifier of the first control, a first operation corresponding to the first control, to enable the electronic device 100 to perform the first operation.

It should be noted that the system architecture shown in FIG. 6 is used to merely explain this application, and shall not constitute any limitation.

As used in the foregoing embodiments, the term "when . . . " may be interpreted to mean "if . . . ", "after . . . ", "in response to it is determined that . . . ", or "in response to it is detected . . . ", depending on the context. Similarly, the phrases "when it is determined" or "if the (described condition or event) is detected" may be interpreted, depending on the context, as "if it is determined that . . . " or "in response to it is determined that . . . " or "when the (described condition or event) is detected" or "in response to detection of the (described condition or event)".

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in the embodiments may be implemented by a computer program instructing related hardware. The program may be stored in a computer readable storage medium. When the program is executed, the processes of the methods in the embodiments are performed. The foregoing storage medium includes various media that can store program code, such as a ROM, a random access memory RAM, a magnetic disk, or an optical disc.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A notification method, comprising:
    establishing, by a first electronic device, a communication connection to a second electronic device;
    obtaining, by the first electronic device, first notification information of a first application, wherein the first notification information comprises first message content, control information corresponding to the first message content, and first extension information, wherein the control information comprises data information of a first control and data information of a second control, and wherein the first extension information comprises a first identifier of the first control;
    displaying, by the first electronic device, a first notification bar based on the first notification information, wherein the first notification bar comprises the first message content, the first control, and the second control;
    based on a device type of the second electronic device being a first type, selecting, by the first electronic device, the data information of the first control from the first notification bar based on the first extension information;

sending, by the first electronic device, second notification information to the second electronic device, wherein the second notification information comprises the first message content and the data information of the first control, but does not comprise the data information of the second control, wherein the second notification information is used to indicate the second electronic device to display a second notification bar, and wherein the second notification bar comprises the first message content and the first control;

receiving, by the first electronic device, the first identifier from the second electronic device in response to a first input for the first control; and performing, by the first electronic device, a first operation corresponding to the first control;

wherein the first extension information further comprises system component version number information that supports sharing of a notification control with another device, and wherein the selecting, by the first electronic device, the data information of the first control from the first notification bar based on the first extension information comprises:

based on the first electronic device determining that the system component version number information comprises a first version number of a system component in the first electronic device, selecting, by the first electronic device, the data information of the first control from the first notification bar based on the first extension information.

2. The method according to claim 1, wherein the data information of the first control comprises one or more of: a display size of the first control, the first identifier of the first control, description information of the first control, or the first operation corresponding to the first control.

3. The method according to claim 1, wherein the first extension information further comprises a second identifier of a third control.

4. The method according to claim 1, wherein before the obtaining, by the first electronic device, the first notification information of the first application, the method further comprises:

when the first electronic device runs the first application, receiving, by the first electronic device, a second input from a user; and generating, by the first electronic device, the first message content based on the second input.

5. The method according to claim 1, wherein before the obtaining, by the first electronic device, the first notification information of the first application, the method further comprises:

receiving, by the first electronic device, notification prompt content from a cloud server and corresponding to the first application; and generating, by the first electronic device, the first message content based on the notification prompt content.

6. The method according to claim 1, wherein based on the device type of the second electronic device being a second type, the method further comprises:

selecting, by the first electronic device, the data information of the second control from the first notification bar based on the first extension information;

sending, by the first electronic device, third notification information to the second electronic device, wherein the third notification information comprises the first message content and the data information of the second control, wherein the third notification information is used to indicate the second electronic device to display a third notification bar, and wherein the third notification bar comprises the first message content and the second control;

receiving, by the first electronic device, a third identifier from the second electronic device in response to a second input for the second control; and performing, by the first electronic device, a second operation corresponding to the second control.

7. A communication system, comprising:

a first electronic device; and a second electronic device;

wherein the first electronic device is configured to:

establish a communication connection to the second electronic device;

obtain first notification information of a first application, wherein the first notification information comprises first message content, control information corresponding to the first message content, and first extension information, wherein the control information comprises data information of a first control and data information of a second control, and wherein the first extension information comprises a first identifier of the first control;

display a first notification bar based on the first notification information, wherein the first notification bar comprises the first message content, the first control, and the second control;

based on a device type of the second electronic device being a first type, select the data information of the first control from the first notification bar based on the first extension information;

send second notification information to the second electronic device, wherein the second notification information comprises the first message content and the data information of the first control, but does not comprise the data information of the second control;

wherein the second electronic device is configured to:

display a second notification bar based on the second notification information, wherein the second notification bar comprises the first message content and the first control;

send the first identifier to the first electronic device in response to a first input for the first control;

wherein the first electronic device is further configured to perform, based on the received first identifier, a first operation corresponding to the first control; and wherein the first extension information further comprises system component version number information that supports sharing of a notification control with another device, and wherein the first electronic device selecting the data information of the first control from the first notification bar based on the first extension information comprises:

based on the first electronic device determining that the system component version number information comprises a first version number of a system component in the first electronic device, the first electronic device selects the data information of the first control from the first notification bar based on the first extension information.

8. The communication system according to claim 7, wherein the data information of the first control comprises one or more of: a display size of the first control, the first identifier of the first control, description information of the first control, or the first operation corresponding to the first control.

9. The communication system according to claim 7, wherein the first extension information further comprises a second identifier of a third control.

10. The communication system according to claim 7, wherein before the first electronic device obtains the first notification information of the first application, the first electronic device is further configured to:

when the first electronic device runs the first application, receive a second input from a user; and generate the first message content based on the second input.

11. The communication system according to claim 7, wherein before the first electronic device obtains the first notification information of a first application, the first electronic device is further configured to:

receive notification prompt content from a cloud server and corresponding to the first application; and generate the first message content based on the notification prompt content.

12. The communication system according to claim 7, wherein based on the device type of the second electronic device being a second type, the first electronic device is further configured to:

select the data information of the second control from the first notification bar based on the first extension information;

send third notification information to the second electronic device, wherein the third notification information comprises the first message content and the data information of the second control, wherein the third notification information is used to indicate the second electronic device to display a third notification bar, and wherein the third notification bar comprises the first message content and the second control;

receive a third identifier from the second electronic device in response to a second input for the second control; and perform a second operation corresponding to the second control.

13. An electronic device, wherein the electronic device is a first electronic device and comprises:

one or more processors;

one or more memories; and wherein the one or more memories are coupled to one or more processors, the one or more memories are configured to store computer program code, the computer program code comprises computer instructions, and when the one or more processors execute the computer instructions, the first electronic device is enabled to perform operations comprising:

establishing a communication connection to a second electronic device;

obtaining first notification information of a first application, wherein the first notification information comprises first message content, control information corresponding to the first message content, and first extension information, wherein the control information comprises data information of a first control and data information of a second control, and wherein the first extension information comprises a first identifier of the first control;

displaying a first notification bar based on the first notification information, wherein the first notification bar comprises the first message content, the first control, and the second control;

based on a device type of the second electronic device being a first type, selecting the data information of the first control from the first notification bar based on the first extension information;

sending second notification information to the second electronic device, wherein the second notification information comprises the first message content and the data information of the first control, but does not comprise the data information of the second control, wherein the second notification information is used to indicate the second electronic device to display a second notification bar, and wherein the second notification bar comprises the first message content and the first control;

receiving the first identifier from the second electronic device in response to a first input for the first control; and performing a first operation corresponding to the first control;

wherein the first extension information further comprises system component version number information that supports sharing of a notification control with another device, and wherein the selecting the data information of the first control from the first notification bar based on the first extension information comprises:

based on the first electronic device determining that the system component version number information comprises a first version number of a system component in the first electronic device, selecting the data information of the first control from the first notification bar based on the first extension information.

14. The electronic device according to claim 13, wherein the data information of the first control comprises one or more of: a display size of the first control, the first identifier of the first control, description information of the first control, or the first operation corresponding to the first control.

15. The electronic device according to claim 13, wherein when the one or more processors execute the computer instructions, the first electronic device is further enabled to further perform operations comprising:

before the obtaining the first notification information of the first application, receiving a second input from a user and generating the first message content based on the second input.

16. The electronic device according to claim 13, wherein when the one or more processors execute the computer instructions, the first electronic device is further enabled to further perform operations comprising:

before the obtaining the first notification information of the first application, receiving notification prompt content from a cloud server and corresponding to the first application, and generating the first message content based on the notification prompt content.

17. The electronic device according to claim 13, wherein when the one or more processors execute the computer instructions, the first electronic device is further enabled to further perform operations comprising:

based on the device type of the second electronic device being a second type, selecting the data information of the second control from the first notification bar based on the first extension information;

sending third notification information to the second electronic device, wherein the third notification information comprises the first message content and the data information of the second control, wherein the third notification information is used to indicate the second electronic device to display a third notification bar, and wherein the third notification bar comprises the first message content and the second control;

receiving a third identifier from the second electronic device in response to a second input for the second control; and performing a second operation corresponding to the second control.

* * * * *